Oct. 2, 1956

G. W. KELLY 2,764,781

PLASTICIZER FOR INJECTION MOLDING MACHINES

Filed Feb. 14, 1955

INVENTOR
George W. Kelly

BY

ATTORNEY

United States Patent Office 2,764,781
Patented Oct. 2, 1956

2,764,781

PLASTICIZER FOR INJECTION MOLDING MACHINES

George W. Kelly, Columbus, Ohio, assignor to Columbus Plastic Products, Inc., Columbus, Ohio, a corporation of Ohio.

Application February 14, 1955, Serial No. 487,962

5 Claims. (Cl. 18—30)

The present invention relates generally to injection molding machines for forming molded plastic or synthetic resin products, and more particularly to an improved mechanical or thermal-type plasticizer for such machines.

Injection molding machines presently comprise, among other components or parts thereof, a device or apparatus which functions to apply heat to a thermoplastic synthetic resin molding material in a manner to plasticize or change the molding material from a solid to a plastic or semi-liquid state during forcible displacement of the molding material between a source of supply and the molding cavity of the machine where the same is formed or shaped into the desired finished product or part. Generally, such plasticizers embody a heated, generally cylindrical, hollow casing located between the outlet of the injection cylinder of the machine and the feed or sprue opening of the dies or mold members of the machine, and a torpedo, in the form of an elongated core device having radial vanes or spiders thereon, positioned axially within the casing of the plasticizer to divide the latter internally and radially into a plurality of separate axial passages. The purpose of the torpedo element of the plasticizer is to divide the mass of molding material introduced therein into a number of separate streams and bring the same into good thermal heat exchange relation to the heated parts of the plasticizer, in order to insure thorough heating and uniform melting of the material as the same passes through the plasticizer prior to introduction thereof into the molding cavity of the machine.

However, it has been found that prior plasticizers of this type are subject to many objections, foremost of which is the trapping of parts of plastic material in and around the relatively stationary torpedo element, and consequent scorching or burning of such trapped parts of plastic and discoloration of the molding material when subjected to prolonged overheating. Also, due to the relatively fixed relation of the torpedo element to the casing of the plasticizer, the same are extremely difficult to service and clean in the event of clogging or obstruction with burned plastic.

Accordingly, it is the primary object of the present invention to provide an improved plasticizer construction for injection molding machines which eliminates the objectionable features of prior plasticizers having relatively stationary casing and torpedo elements, and which provides a materially higher efficiency in transferring heat from the heat source to the plastic material passing therethrough, thereby reducing substantially the degree of heat necessary to effectively plasticize the molding material during passage thereof through the plasticizer.

It is another object of the present invention to provide a plasticizer device for injection molding machines wherein the torpedo element of the plasticizer is arranged to rotate within its associated casing during passage of plastic materials through the heating chamber of the plasticizer, to thereby effectively churn, agitate and distribute the molding material efficiently over the heated surfaces of the plasticizer and cause progressive movement of such materials through the heating chamber of the plasticizer in a manner to avoid trapping or clogging of parts of the molding material in and around the components of the plasticizer device.

It is a further object of the invention to provide a plasticizer of this character which embodies a hollow casing member having an internal chamber in which is rotatably supported, upon a plurality of ball bearings or the like, a rotary torpedo element, the ball bearing elements serving to maintain the torpedo element in inwardly spaced, concentric relation to the inner side walls of the casing, and being arranged transversely of the internal chamber of the casing so as to separate the mass of molding material passing through the plasticizer into a number of separate streams which are integrally churned and mixed during passage thereof through the plasticizer.

For a further and more complete understanding of the present invention and the various additional objects and advantages realized therefrom, reference is made to the following description and the accompanying drawings, wherein.

Figure 1:
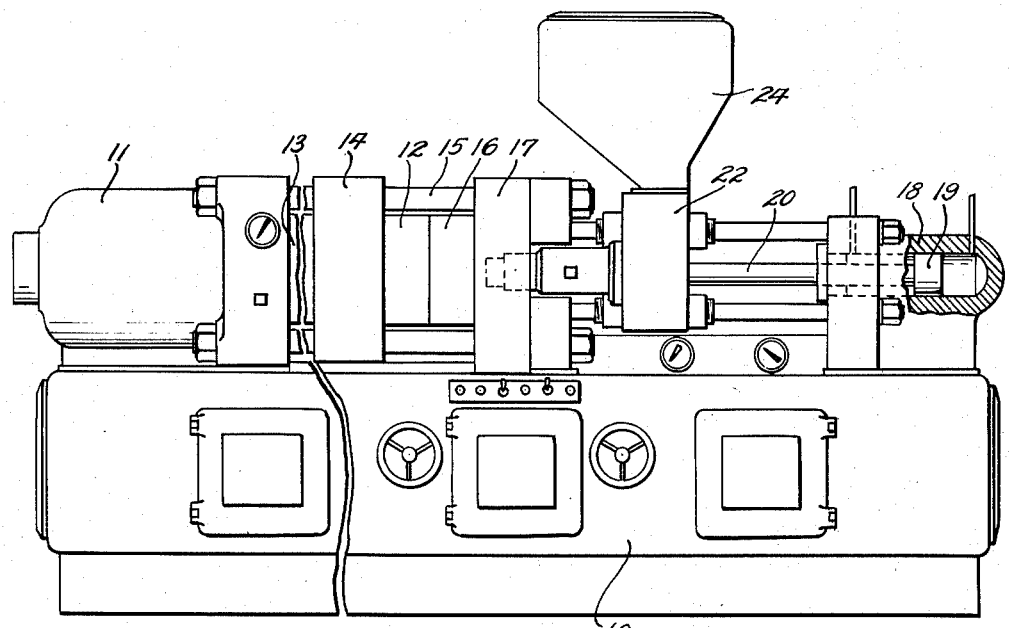
Fig. 1 is a side elevational view, partially in vertical section, of an injection molding machine embodying the present improved plasticizer.
Figure 2:
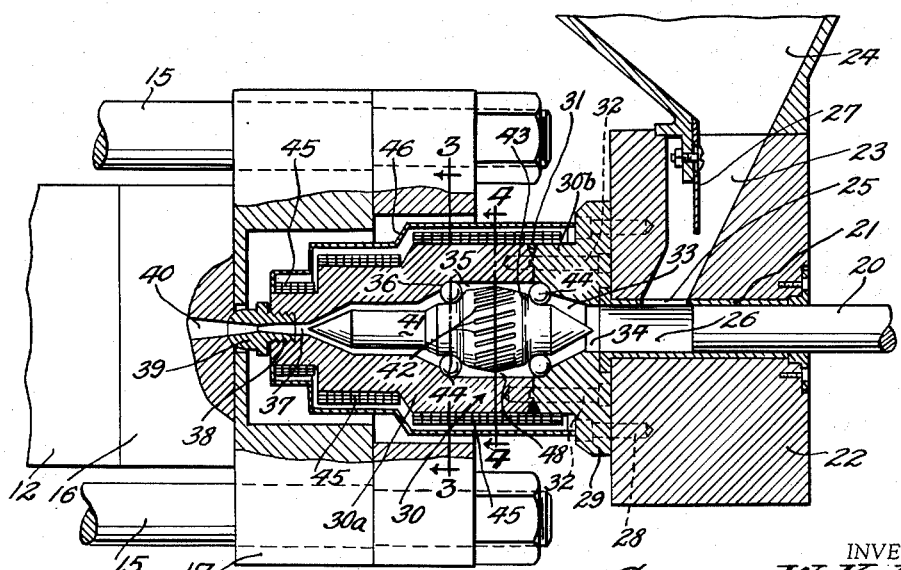
Fig. 2 is an enlarged longitudinal vertical sectional view taken through the plasticizer and adjoining parts of an injection molding machine.

Referring now to the drawings, Fig. 1 discloses generally an injection molding machine of a type to which the present plasticizer is applicable. The machine comprises, in substance, a floor supported base section 10, which houses the usual hydraulic and electrical control apparatus, not shown, common to machines of this type. Mounted upon the base section 10 is the cylinder 11 of a hydraulic motor or ram employed in imparting opening and closing movement to a movable die section 12. The cylinder is provided with an extensible ram 13 which is connected at its outer end with the die-supporting head 14 slidably carried upon relatively stationary and spaced guide and strain rods 15. Disposed in opposed relation to the movable die section 12 and its associated support 14 is a relatively stationary die section 16 and associated bed plate 17.

Carried at the opposite end of the base section 10 is a second hydraulic motor or ram comprising a cylinder 18 and a piston 19. The piston 19 is provided with an extensible ram or plunger 20, the outer end of which extends into an injection cylinder 21 formed or otherwise provided in a stationary hopper-supporting bolster 22. The bolster 22 is provided with a generally vertically arranged feed passage 23 which communicates with the lower open end of a supply hopper 24 into which a supply of granular or powdered synthetic resinous material is introduced and stored. The lower end of the feed passage 23 terminates in an outlet opening 25 communicating directly with the injection chamber 26 formed in the cylinder 21. Advantageously, an adjustable valve gate 27, or other suitable means, may be arranged within the throat of the passage 23 to regulate the rate of gravitational flow of molding material from the hopper to the injection cylinder 21.

It will here be understood that the apparatus and parts thereof heretofore described are common to the ordinary or usual type of horizontal injection molding machine, and, as such, constitute no part of the present invention, but have been described for purposes of illustrating the function, position and arrangement of the present improved plasticizer as hereinafter described.

Positioned adjacent the outlet end of the injection chamber 26, and bolted, as at 28, to the hopper-supporting bolster 22 is the diametrically enlarged base flange 29 of a generally cylindrical, longitudinally stepped metallic plasticizer casing 30. For purposes of assembly, the casing 30 is formed in two sections 30a and 30b which, following assembly of associated internal parts, as will be hereinafter described, are welded, as at 31, and bolted together, as at 32, to provide a substantially unitary outer casing structure. The respective sections 30a and 30b of the casing 30 are bored to provide a continuous axially disposed heating chamber 33 extending throughout the length of the casing 30. The chamber 33 at one end is formed with an inlet opening 34 having the same diameter as the injection chamber 26 and arranged to form a longitudinal continuation of the latter. Inwardly of the inlet opening 34, the chamber 33 flares into a relatively enlarged intermediate cylindrical bore 35 defined on each end by annular ball bearing-retaining shoulders 36. Beyond the intermediate cylindrical portion 35, the chamber 33 tapers inwardly in angular stages and terminates in a relatively restricted outlet passage 37. The outer end section 30a of the casing 30 is bored and tapped adjacent the outlet passage 37 and receives the screw-threaded shank 38 of an injection nozzle 39 which is disposed normally in abutting and communicating relation to the feed passage or sprue 40 of the stationary die section 16.

Occupying the chamber 33 of the plasticizer casing 30, and disposed in concentric inwardly spaced relation to the walls of the chamber is a rotary torpedo or core device 41. The torpedo or core device 41 is preferably cylindrical in cross section and is formed at either end thereof with pointed extremities terminating along the common axis of the inlet 34 and the outlet 37 of the plasticizer chamber. The intermediate portion of the torpedo 41 is relatively larger in diameter than the end portions thereof and is formed peripherally with a plurality of helical or spirally disposed grooves or recesses 42. On each side of the grooved, diametrically enlarged intermediate portion of the torpedo 41, the latter is formed with bearing-retaining shoulders 43. Positioned between these shoulders 43 and the shoulders 36 of the casing 30 are two annular sets of antifriction-type ball bearings 44 which function to rotatably support the torpedo 41 for rotation about its longitudinal axis within the chamber 33.

Positioned around the stepped outer peripheral portions of the casing 30 are a plurality of electrical strap-type resistance heaters 45 operable upon energization to heat the metal casing 30 by conduction throughout substantially the entire length thereof. Enclosing the casing 30 and its associated resistance heaters 45 is an external casing 46, preferably of thermal insulating material, to minimize heat loss to the atmosphere surrounding the heaters 45.

Figure 3:
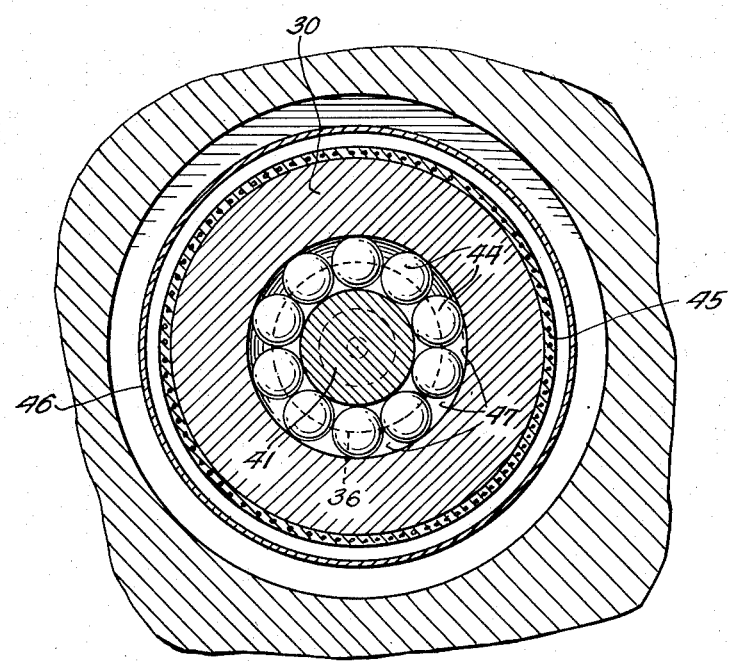
Fig. 3 is an enlarged transverse vertical sectional view taken along the line 3—3 of Fig. 2.
Figure 4:
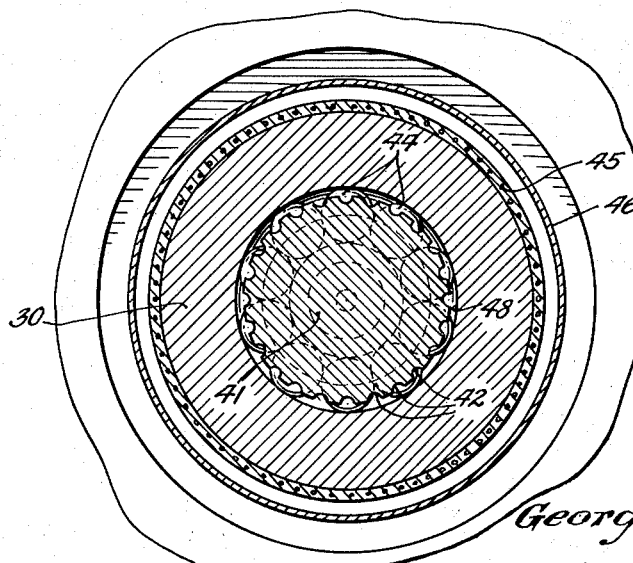
Fig. 4 is a similar view taken along the line 4—4 of Fig. 2.

As shown particularly in Fig. 3 of the drawings, the antifriction ball bearings 44 are grouped to form substantially continuous annuli about the shouldered bearing-receiving surfaces of the torpedo 41, but by reason of the spherical configuration of the ball bearings 44, relatively restricted spaces 47 are provided between the individual balls to permit of the axial passage of molding material through the chamber 33. It will also be noted by reference to Fig. 4 of the drawings that the grooved or recessed intermediate portion of the torpedo 41 is sized so as to be relatively closely spaced inwardly from the adjacent region of the inner walls of the casing 30 to thereby provide a relatively restricted annular passage 48 between the intermediate portion of the torpedo and the walls of the casing.

In operation, on each injection cycle of the injection plunger 20 of the machine, a predetermined quantity of granular or powdered molding material supplied from the hopper 24 is forcibly injected into the inlet opening 34 of the plasticizer chamber 33, and assuming that the plasticizer chamber and interconnecting passages are completely filled with molding material, as is the usual case, a given charge of originally granular molding material is advanced axially through the plasticizer by the repeated reciprocation of the injection plunger 20 within the injection chamber 26. As the granular molding material is introduced within the chamber of the heated plasticizer casing, the same is heated through conduction and thermal contact with the walls of the casing defining the chamber 33 progressively during its passage from the inlet to the outlet end of the chamber. At the same time, the mass of molding material is broken up and diffused into separate streams during passage thereof through the spaces provided by the ball bearings 44, with the result that a greater surface area of the plastic material is exposed directly to heating by contact with the parts of the heated plasticizer. It will be understood that, in addition to the casing 30, the ball bearings 44 and torpedo 41 will also become heated primarily through conduction from the walls of the casing 30 which are in direct thermal contact with the electrical resistance heaters 45.

To further insure desired agitation of the molding material and exposure of substantially all surfaces thereof to the heated surfaces of the plasticizer, the torpedo 41 is arranged to rotate axially within the chamber 33 under pressures subjected upon the helically disposed recesses 42 and the corresponding lands formed on the periphery of the torpedo between the recesses 42 with the result that the molding material is not only divided into individual relatively small streams, but at the same time is swirled or churned within the plasticizer chamber during its movement between the inlet and outlet ends thereof. In this manner, the originally granular or powdered molding material received from the hopper 24 is efficiently and uniformly heated, and mixed together to provide a homogeneous, thoroughly plasticized column or stream of molding material at the outlet end of the plasticizer which is intermittently forced into the dies 12 and 16 of the machine for molding into the finished product or part.

By nature of the more or less streamlined shape of the torpedo 41, the ball bearings 44 and the inner side walls of the casing 30 which define the plasticizer chamber, together with the rotative movement of the torpedo and ball bearings, there is practically no tendency on the part of the molding material to stick or adhere to the internal parts of the plasticizer as is the usual case with plasticizers in present day use, wherein the torpedo and casing elements remain relatively stationary. Hence, due to the materially increased surface exposure and mixing or churning of the molding material as the same passes through the present plasticizer devices, the maximum operating temperatures of the resistance heaters 45 may be materially reduced as compared with the temperatures ordinarily employed with prior plasticizer devices. This reduction in maximum temperature materially reduces and minimizes the possibility of burning or scorching of the molding material within the plasticizer should individual products or parts of the molding material remain for an excessively long period of time at any one given spot or area within the chamber 33.

In view of the foregoing, it will be seen that the present invention provides an efficient and mechanically simple thermal plasticizer device for injection molding machines, wherein, the plasticizer is characterized by reduced operating and maintenance costs, and ease of installation, assembly and disassembly.

While a single presently preferred embodiment of the invention has been disclosed in detail in the foregoing drawings and specification, it will be understood that various modifications as to details of construction and design are possible without departing from the spirit of the invention or the scope of the following claims.

I claim:

1. A thermal plasticizer for an injection molding machine comprising a casing formed with an internal axially disposed chamber having an inlet at one end to receive unplasticized materials injected therein and a relatively restricted outlet at its opposite end through which materials may be discharged from said chamber; heating means in thermal heat-transfer relation to said casing for heating materials during passage thereof through said chamber; a rotary core member occupying the chamber of said casing; a plurality of antifriction devices positioned between said core member and the walls of said chamber and rotatably supporting said core member in inwardly spaced relation to the walls of said casing defining said chamber, said antifriction devices being arranged to provide a plurality of relatively restricted passages therebetween; and means provided on said core member for causing axial rotation thereof upon the forcible displacement of material through the chamber of said casing.

2. A thermal plasticizer for injection molding machines comprising a casing formed with an internal chamber having an inlet at one end and an outlet at its opposite end; heating means disposed in direct heat-transfer relation to said casing; a torpedo positioned in said chamber between the inlet and outlet ends thereof; means positioned transversely of said chamber between said torpedo and the walls of said casing defining said chamber and supporting said torpedo in inwardly spaced relation to the walls of said chamber and for rotation about the longitudinal axis of said chamber, said last-named means being arranged to define a plurality of separate, relatively restricted passages extending longitudinally of said chamber between the outer surface of said torpedo and the walls of said casing defining said chamber; and means provided on said torpedo to cause axial rotation thereof within said chamber in response to the forcible displacement of a molding material longitudinally through said chamber.

3. A thermal plasticizer as defined in claim 2, wherein the torpedo-supporting means comprises longitudinally spaced, annular sets of ball bearings.

4. A thermal plasticizer as defined in claim 2, wherein the torpedo-supporting means comprises longitudinally spaced, annular sets of ball bearings and said torpedo is formed between said sets of ball bearings with external helical grooves.

5. A thermal plasticizer for injection molding machines comprising a casing formed with an internal chamber having an inlet at one end and an outlet at its opposite end; heating means disposed in direct heat-transfer relation to said casing; a torpedo rotatably positioned in said chamber between the inlet and outlet ends thereof; bearing means positioned transversely of said chamber between said torpedo and the walls of said casing defining said chamber and supporting said torpedo in inwardly spaced relation to the walls of said chamber and for rotation about the longitudinal axis of said chamber, said bearing defining a plurality of separate, relatively restricted passages in open communication with an annular space extending longitudinally of said chamber between the outer surface of said torpedo and the walls of said casing defining said chamber; and a circularly disposed row of relatively spaced, helical grooves provided in the outer surface of said torpedo for producing axial rotation of said torpedo in response to forcible displacement of molding material longitudinally through said chamber.

References Cited in the file of this patent

UNITED STATES PATENTS

| | | |
|---|---|---|
| 2,565,411 | Van Buuren | Aug. 21, 1951 |
| 2,696,641 | Schwartz | Dec. 14, 1954 |
| 2,704,380 | Cuzzi | Mar. 22, 1955 |